US005905247A

United States Patent [19]

Ilén

[11] Patent Number: 5,905,247

[45] Date of Patent: May 18, 1999

[54] PARKING FEE SYSTEM, CONTROL DEVICE AND IDENTIFICATION MEANS

[75] Inventor: Tero Ilén, Kotka, Finland

[73] Assignee: Payway Oy, Espoo, Finland

[21] Appl. No.: 08/894,646

[22] PCT Filed: Feb. 27, 1996

[86] PCT No.: PCT/FI96/00114

§ 371 Date: Sep. 4, 1997

§ 102(e) Date: Sep. 4, 1997

[87] PCT Pub. No.: WO96/27170

PCT Pub. Date: Sep. 6, 1996

[30] Foreign Application Priority Data

Feb. 28, 1995 [FI] Finland .................................... 950918

[51] Int. Cl.$^{6}$ .............................. G06K 15/00; G06F 7/08

[52] U.S. Cl. ............................................ 235/384; 235/381

[58] Field of Search .................................... 235/384, 382, 235/382.5, 492, 462, 470; 364/401, 406, 407, 408, 467; 340/825.31, 825.32

[56] References Cited

U.S. PATENT DOCUMENTS

| | | | |
|---|---|---|---|
| 4,555,618 | 11/1985 | Riskin . | |
| 4,720,785 | 1/1988 | Shapiro | 364/401 |
| 4,876,540 | 10/1989 | Berthon et al. | 340/932.2 |
| 4,908,500 | 3/1990 | Baumberger . | |
| 4,958,064 | 9/1990 | Kirkpatrick | 235/384 |
| 4,982,070 | 1/1991 | Bezin et al. | 235/378 |
| 5,166,680 | 11/1992 | Ganot | 340/932.2 |
| 5,173,883 | 12/1992 | Ilie et al. | 368/90 |
| 5,235,565 | 8/1993 | Aschenbrouich et al. | 368/90 |
| 5,241,162 | 8/1993 | Ilie et al. | 235/384 |
| 5,459,304 | 10/1995 | Eisenmann | 235/380 |

FOREIGN PATENT DOCUMENTS

WO 93/20539 10/1993 WIPO .

*Primary Examiner*—Thien Le
*Attorney, Agent, or Firm*—Panitch Schwarze Jacobs & Nadel, P.C.

[57] ABSTRACT

A parking fee system includes a parking fee register in which information is maintained on one or more vehicles known to the system for which payment is made for parking, a vehicle-specific identification device from which a vehicle code of a vehicle is machine readable, and a control device for automatically reading the vehicle code from the vehicle-specific identification device for transmitting a control request message containing the vehicle code to the parking fee register, and for receiving a control information message reporting on the payment or non-payment of the parking fee and for notifying a user of the device of the information included in the control information message.

13 Claims, 2 Drawing Sheets

PARKING FEE SYSTEM, CONTROL DEVICE AND IDENTIFICATION MEANS

BACKGROUND OF THE INVENTION

The present invention relates to a parking fee system comprising: a parking fee register in which information is maintained on the vehicles within the system for the parking of which payment is made at each time. The invention also relates to a control device for controlling the payment of a parking fee in a system comprising a parking fee register in which information is maintained on the vehicles within the system for the parking of which payment is made at each time. The invention also relates to a vehicle-specific identification means comprising attachment means for attaching the identification means onto a vehicle, and on which a vehicle-specific vehicle code of the vehicle is indicated by letters and/or numbers.

In this application the concept parking fee register refers generally to the register itself and to computer equipment by means of which the register is maintained and by means of which the contents of the register can be checked.

Prior art teaches parking fee systems in which a driver of a vehicle immediately after parking, calls a predetermined service number with a mobile phone and dials a digit sequence with the mobile phone for paying the parking fee. In that case the digit sequence dialled by the driver includes the code of the parking space in which the driver has parked the vehicle, for example. Information is stored into the parking fee register of the system for the car that has been parked, whereby the system starts calculating the parking fee on the basis of predetermined hourly charging. Similarly, at the end of parking, the caller makes a new call, whereby information is stored into the parking fee register that the parking has terminated. In this known system a traffic warden uses a portable computer which receives information from the parking control register and which is capable of informing if a parking fee is being paid from a parking space with a specified code at that moment.

The most significant disadvantage of the above system is that each parking space within the system has to have a separate code of its own. This causes considerable practical problems in cities, for example, in which there may be a great number of parking spaces. For example, the system is totally unusable on streets where specific parking spaces have not been indicated.

Another disadvantage of the above system is that it is difficult to control. In order that a traffic warden could determine if a parking fee is being paid from a specified parking space, the code of said space, street or part of town must be entered into the warden's portable computer terminal for controlling. Said process is understandably rather slow and very laborious.

BRIEF SUMMARY OF THE INVENTION

The object of this invention is to solve the above-mentioned problems and provide a user-friendly parking fee system in which parking control is very easy. This object is achieved with the system according to the invention that is characterized in that the system comprises: a vehicle-specific identification means from which a vehicle code of a vehicle is readable by machine, and a control device for reading automatically the vehicle code from the identification means, for transmitting a control request message containing the vehicle code to the parking fee register, and for receiving a control information message informing of the payment or non-payment of the parking fee and for notifying the user of the device of the information included in the control information message.

In this context, the reading of the vehicle code automatically by machine refers to reading the contents of for instance, a bar code or an inductive tag, i.e. an escort memory, whereby a vehicle-specific code can be supplied to the control device without the user needing to feed the code manually into the device. In this context, a tag, i.e. an escort memory refers to a unit known per se which includes a memory circuit the data contained in which can be read by measuring the change caused by the tag into a magnetic field prevailing in its environment. The data contained in the tag can typically be read through all non-metal objects, such as the windscreen of a vehicle. A typical reading distance varies between 5 to 50 cm depending on the antenna in use.

The invention is based on the idea that when all the vehicles within the parking fee system are provided with vehicle codes that are automatically readable by machine, parking control can be made car-specific, whereby the utilization of the system does not require significant changes (such as numbering the parking spaces) into the infrastructure, or that vehicles should require valuable devices for collecting the parking fee. The identification means needed in vehicles are very inexpensive and at their simplest comprise a bar code sticker. However the ability to automatically read the vehicle code is very significant for the control concept as a traffic warden is then not required to manually feed the code into the control device for identifying the vehicle. It is sufficient that the control device is placed in the vicinity of the identification means after which the control device finishes the procedure. The most significant advantages of the system according to the invention is that it is user-friendly, simple and fast to control and the device costs are low.

The invention also relates to a control device that can be employed in the system according to the invention. The control device according to the invention is characterized in that the control device comprises: reading means for automatically reading the vehicle code of a vehicle, transmitter means for transmitting a control request message containing the vehicle code to the parking fee register and receiver means for receiving a control information message reporting on the payment or non-payment of the parking fee and for notifying the user of the device of the information included in the control information message.

The transmitter and receiver means of the fee device preferably consists of a radio part utilizing the GSM mobile telephone system, whereby connection to a parking control register can be realized by using existing telecommunication connections. When the control device is also provided with a printer, a parking ticket can be automatically printed by it when necessary by means of the information stored into the parking fee register and the information supplied by the user of the device. Thus the giving of a parking ticket will become significantly easier and faster.

When the control device is provided with a display screen indicating the registration number of the checked car in the parking fee register, it can be verified that in actual fact it is the vehicle the vehicle code belongs to. The falsification of a vehicle-specific identification means is thus prevented as there is no use falsifying/copying a sticker with a bar code.

The invention further relates to a vehicle-specific identification means that can be employed in the system according to the invention. The identification means according to the invention is characterized in that the identification means comprises means with the help of which the vehicle code of the vehicle is readable by machine. When a sticker used as an identification means is attached to a predetermined place in the vehicle, onto the windscreen, for example, a traffic warden can immediately at a glance find out if a specified vehicle is within the system. If this is so, the traffic warden can then determine if the parking is being paid for by placing the control device near the identification means, whereby the control device will notify after a while if a parking fee is being paid for the vehicle or not.

The preferred embodiments of the system, control device and the identification means according to the invention are disclosed in the appended dependent claims 2 to 3, 5 to 9 and 11. The invention will in the following be explained by means of one preferred embodiment of the system according to the invention with reference to the appended figures, in which

DETAILED DESCRIPTION OF THE INVENTION

Figure 1:
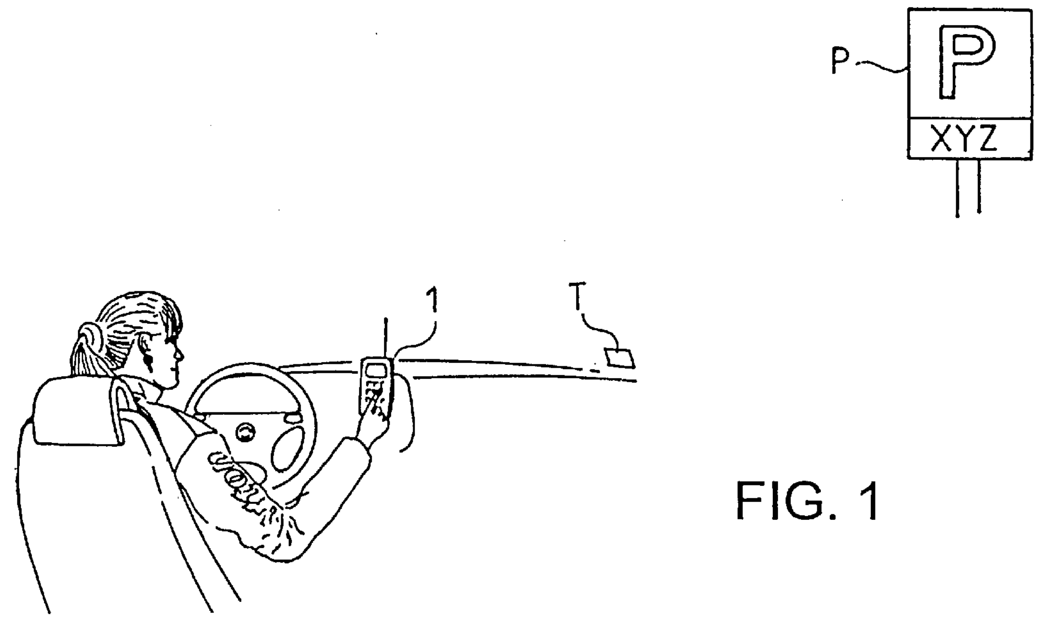
FIG. 1 illustrates parking taking place in accordance with the invention.

FIG. 1 illustrates parking taking place in accordance with the invention. In the case shown in FIG. 1, the driver calls with a GSM mobile phone 1 to a predetermined service number for registering the start of parking to the parking fee register. If the driver does not have a GSM mobile phone in use, the call can be made to the service number in question with any other phone, with a coin-operated telephone situated near the parking area, for example.

After having dialled the service number, the driver will next enter a personal user code. If, however, the driver has in use a GSM phone or the like in which the user code is stored into a function card activating the phone, such as the SIM card (Subscriber Identification Module) of the GSM phone, the user's user code can be registered into the parking fee register automatically without the user code having to be entered manually. If the driver, however, uses somebody else's GSM phone, by entering the user code of his/her own, the driver can direct the parking fee to be charged from himself/herself and not from the owner of the phone. The structure and operation of the GSM system is described for example in The *GSM System for Mobile Communications*, by M. Mouly & M. Pautet, Palaiseau, France, 1992, ISBN:2-9507190-0-0-7, wherefore it will not be described more closely herein.

After having entered the user code (if it is necessary), the driver next enters the code of the parking zone which is indicated on a near-by traffic sign P or the like.

After having entered the zone, the driver enters the vehicle code of the vehicle in use which is indicated on an identification means, that is, a sticker T, for example, attached to the windscreen. Only numbers are preferably included in the vehicle code and in all the other information supplied via a phone, wherefore it will be easy to enter the code and forward it by a phone. The vehicle code is also indicated on the sticker T in a form readable by machine, for example as a bar code. Alternatively, a tag of 64 bits, for example, may be integrated into the sticker from which the vehicle code is readable inductively.

It is not necessary to enter the vehicle code if the vehicle used by the driver is the driver's own permanent vehicle. In that case the parking fee system is able to find out on the basis of the user code the vehicle code supplied as a default value corresponding to the user code. That is, it is necessary to supply the user code only if the driver uses some other vehicle than the permanent vehicle of his/her own.

It is apparent from the above that in the simplest case when a driver is driving a permanent vehicle of his/her own and uses a GSM phone of his/her own, the driver needs not enter anything else but the service number of the parking fee system and the parking zone code when parking.

When the parking is being terminated, the driver re-enters said service number and his/her user code if a GSM phone of his/her own is not used. Then information is transmitted on the termination of parking to the parking fee register.

Figure 2:
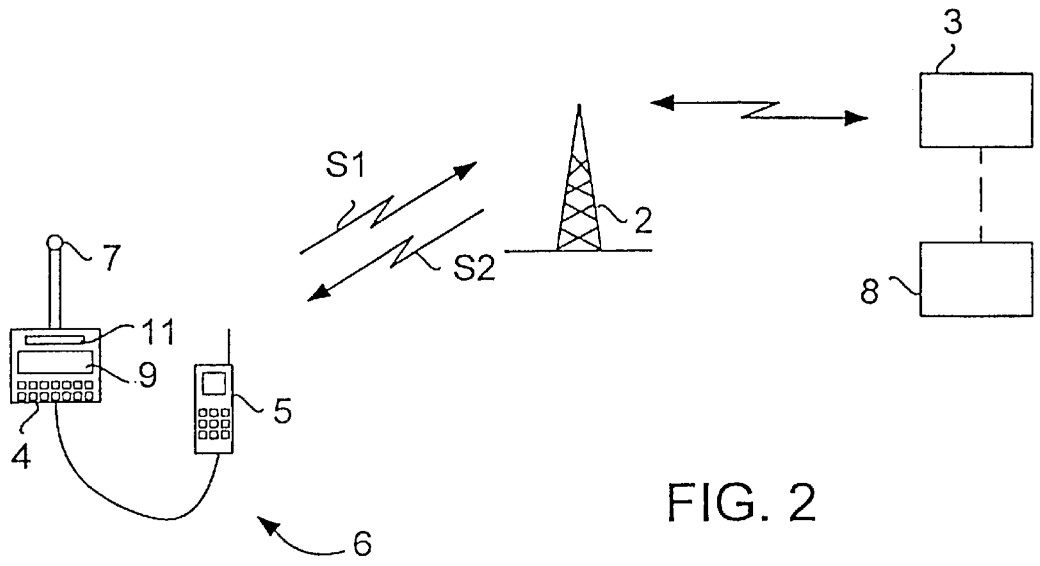
FIG. 2 shows a block diagram of the first preferred embodiment of the parking system according to the invention.

FIG. 2 shows a block diagram of a first preferred embodiment of the parking system according to the invention.. FIG. 2 shows a base station 2 of the GSM system and a mobile switching centre 3 and a parking fee register 8 connected to the mobile switching centre, the register comprising a computer unit and one or more registers maintained by it. The parking fee register need not be in direct contact with the mobile switching centre 3, but a fixed telephone network may establish the connection.

A traffic warden uses a control device 6 which in the case of FIG. 2 comprises a computer unit 4 and an ordinary GSM mobile phone 5 connected to it. When a traffic warden arrives at a parked vehicle, he/she first checks visually if a sticker T is attached to the windscreen of the vehicle, which indicates that the vehicle belongs to the parking fee system according to the invention. If this the case, the traffic warden then places a read head 7 of the control device near the sticker and presses an activation key in the control device. Then the read head 7 automatically reads the vehicle code of the vehicle from the identification means of the vehicle, that is, from the sticker by means of the bar code or the tag therein.

When the vehicle code 10 has been read, the control device 6 calls automatically to a predetermined service number of the parking fee register 8 with the GSM phone 5. When a connection has been established, the control device 6 sends a control request message containing the vehicle code to the parking fee register. The parking fee register checks if a parking fee is being paid at that moment for the vehicle in question. When the check has been completed, the parking fee register sends a control information message S2 to the control device 6 by the Short Message Service SMS of the GSM system, for example.

When the control device 6 receives a control information message S2, it notifies the information it contains to the traffic warden by means of a display screen 9. The display screen then shows:

the registration code of the vehicle the code of the zone the parking fee is being paid for, the starting time of parking, the remaining parking time.

The control device 6 preferably comprises a printer 11 with which the traffic warden can automatically print a parking ticket if the parking has not been paid for or if the maximum parking time has been exceeded. In this case, the control device adds the information in the control information message S2 into the parking ticket to be printed automatically, in addition to which the traffic warden may enter manually additional information to the parking ticket by means of the keyboard of the device 4. The control device may also notify the parking fee register of the fine, whereby the parking ticket may be automatically added to the telephone bill of the owner/user of the vehicle.

Although the control device in the case of FIG. 2 is in two parts, it can naturally also be comprised of one part, whereby a radio part 5 is integrated into the computer unit 4. The radio part 5 of the control device does not necessarily need to operate in the GSM system, but it may as well be connected to the parking fee register 8 via some other radio system.

Figure 3A:
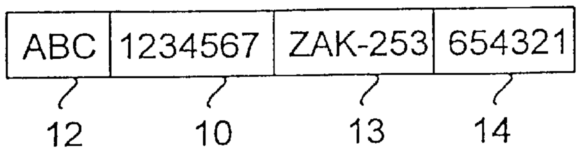
FIG. 3*a* and 3*b* illustrate information maintained in the parking control register.
Figure 3B:
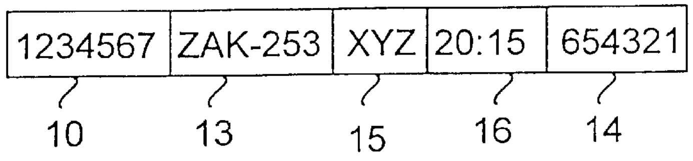

FIGS. 3*a* and 3*b* illustrate information maintained in the parking fee register. The parking fee register may for example comprise two separate databases in the first of which subscriber data is maintained and in the second information is maintained on the vehicles that at that moment are paying a parking fee.

FIG. 3*a* illustrates a subscriber data register in which information is maintained on every subscriber within the system. The subscriber data register indicates a user code 12, a vehicle code 10 of the vehicle normally used by the subscriber, a registration number 13 of the vehicle normally used by the subscriber and information needed for charging the subscriber, such as a telephone number 14 to the telephone bill of which the subscriber's parking fees will be added.

The user code 12 is preferably selected so that it contains information relating to the home country and home town of the user and information needed for charging, such as the code of the user's teleoperator. Thus the parking fee system will become international, whereby parking taking place in a neighboring country, for example, can be paid by using the same system.

When a subscriber registers into the parking fee register in connection with parking, said information is retrieved from the subscriber data register as default values for the register maintaining information on parked cars. That means that if the subscriber does not enter separately the vehicle code, the system assumes that a payment is being made for a vehicle that is indicated at the user code in question in the subscriber register.

FIG. 3*b* illustrates a register maintained on parked cars. Traffic wardens, for example, find out from this register if a prescribed parking fee is being paid for a specified vehicle. The register indicates the vehicle code 10 of the parked vehicle, the registration number 13, a code 15 of the notified zone, a starting time 16 of parking and the number 14 of the telephone to the telephone bill of which the parking fee is added.

The parking system is capable of finding out by means of the zone code 15 in which town the parking takes place, the hourly charging prescribed for parking and the longest allowed parking time. When the system can also independently find out the precise starting time 16 of parking by means of the timer of the parking fee register, the remaining parking time can be settled by simple calculation. Similarly, the system can calculate the accumulated parking fee by multiplying the time interval between the starting time and terminating time of parking by the hourly charging determined for the parking zone.

Figure 4:
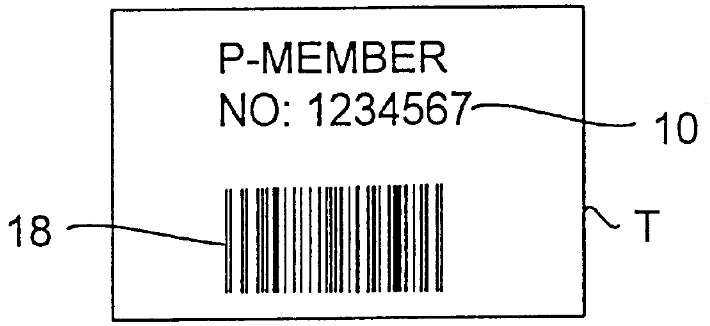
FIG. 4 shows a first preferred embodiment of the identification means according to the invention.

FIG. 4 shows a first preferred embodiment of the identification means according to the invention. In the case of FIG. 4, the identification means T consists of a sticker attached to the windscreen of a vehicle in which sticker the vehicle code 10 is indicated by numbers. Also, the vehicle code is indicated in the identification means in a form readable by machine, that is, as a bar code 18 in the case of FIG. 4. When needed, the bar code 18 of FIG. 4 can be replaced by an inductively readable tag, i.e. an escort memory of some millimeters in size which can be attached to the back side of the sticker with glue, for instance.

It is to be understood that the specification above and the figures relating thereto are only meant to illustrate the present invention. The different variations and modifications of the invention will be obvious to one skilled in the art without deviating from the scope and spirit of the appended claims.

I claim:

1. A parking fee system comprising:

a parking fee register in which parking information is maintained on a vehicle within the system for the parking of which payment is made each time the vehicle is parked;

a vehicle-specific identification means from which a vehicle code the vehicle is machine readable; and a control device for automatically reading the vehicle code from the vehicle-specific identification means for transmitting a control request message containing the vehicle code to the parking fee register, and for receiving a control information message reporting on the payment or non-payment of a parking fee and for notifying a user of the control device of control information included in the control information message.

2. A parking fee system according to claim 1, wherein the vehicle-specific identification means comprises a bar code from which the vehicle code is readable optically.

3. A parking fee system according to claim 1, wherein the parking fee register maintains the parking information on the vehicle code, a registration number, a parking zone, a starting time of parking of a parked vehicle and a telephone number to the telephone bill to which the parking fee is added.

4. A control device for controlling the payment of a parking fee in a system comprising:

a parking fee register in which information is maintained on a vehicle within the system for the parking of which payment is made each time, the vehicle is parked;

reading means for automatically reading a vehicle code of the vehicle, transmitter means for transmitting a control request message containing the vehicle code to the parking fee register and receiver means for receiving a control information message informing of the payment or non-payment of a parking fee and for notifying a user of the control device of control information included in the control information message.

5. A control device according to claim 4, wherein the reading means comprise a bar code reader.

6. A control device according to claim 4, wherein the reading means comprise means for reading inductively the vehicle code stored into an escort memory.

7. A control device according to claim 4 wherein the transmitter means and receiver means comprise a radio part utilizing the GSM mobile telephone system, whereby signaling between the control device and the parking fee register is carried out using the GSM system.

8. A control device according to claim 4 wherein the control device comprises a user interface provided with a keyboard and a printer for printing a parking ticket in response to control information included in the control information message and/or to user information supplied by the user of the device by means of the keyboard.

9. A control device according to claim 4 wherein the control device has a display screen on which the display screen notifies the user of the control device of the control information included in the control information message including at least a registration number of the vehicle, a code of the parking fee zone from which payment is made for said vehicle each time the vehicle is parked, and a remaining parking time.

10. A vehicle-specific identification means comprising attachment means for attaching the identification means onto a vehicle, and on which a vehicle-specific vehicle code of the vehicle is indicated by letters and/or numbers wherein the vehicle code of the vehicle is machine readable.

11. A vehicle-specific identification means according to claim 10, wherein said vehicle-specific identification means comprises a sticker attachable onto a vehicle windscreen, and that said machine readable means comprise an optically readable bar code printed onto the sticker.

12. A parking fee system according to claim 1, wherein the vehicle-specific identification means comprises an escort memory from which the vehicle code is readable inductively.

13. An identification means according to claim 10, wherein said identification means comprises a sticker attachable onto a vehicle windscreen and that said machine readable means comprise an inductively readable escort memory integrated into the sticker.

* * * * *